United States Patent [19]
Aditya

[11] Patent Number: 5,918,021
[45] Date of Patent: Jun. 29, 1999

[54] SYSTEM AND METHOD FOR DYNAMIC DISTRIBUTION OF DATA PACKETS THROUGH MULTIPLE CHANNELS

[75] Inventor: Vikas Aditya, Hillsboro, Oreg.

[73] Assignee: Intel Corporation, Santa Clara, Calif.

[21] Appl. No.: 08/657,397

[22] Filed: Jun. 3, 1996

[51] Int. Cl.[6] .............................. G06F 13/00; G06F 13/14
[52] U.S. Cl. ................................ 395/200.65; 395/200.71; 395/200.73; 370/536
[58] Field of Search ...................... 395/200.71, 200.73, 395/200.65; 345/333; 370/536; 340/825.8; 361/803

[56] References Cited

U.S. PATENT DOCUMENTS

| | | | |
|---|---|---|---|
| 5,175,733 | 12/1992 | Nugent | 370/94.3 |
| 5,339,392 | 8/1994 | Risberg et al. | 345/333 |
| 5,345,229 | 9/1994 | Olnowich et al. | 340/825.8 |
| 5,513,322 | 4/1996 | Hou | 395/200.73 |
| 5,533,198 | 7/1996 | Thorson | 395/200.69 |
| 5,539,621 | 7/1996 | Kikinis | 361/803 |
| 5,596,722 | 1/1997 | Rahnema | 395/200.71 |

*Primary Examiner*—Frank J. Asta
*Assistant Examiner*—Ivan C. Pierce, III
*Attorney, Agent, or Firm*—Blakely, Sokoloff, Taylor & Zafman LLP

[57] ABSTRACT

A communication system featuring a plurality of nodes in which at least one node is implemented with adaptive driver software following a load balancing scheme that takes into account packet characteristics associated with the data traffic load before dynamically distributing the data traffic among multiple communication channels. Of these communication channels, only one channel is allowed to receive data requests and all of the channels are allowed to transfer data packet(s) to the data requesting node.

18 Claims, 4 Drawing Sheets

SYSTEM AND METHOD FOR DYNAMIC DISTRIBUTION OF DATA PACKETS THROUGH MULTIPLE CHANNELS

BACKGROUND OF THE INVENTION

1. Field of the Invention

The present invention relates to the field of data transfer. More particularly, the present invention relates to a system and method that dynamically distributes data traffic load among multiple channels to improve overall performance of the system.

2. Description of Art Related to the Invention

With the continual emergence of smaller, faster and more powerful computers, many businesses have implemented or are in the process of implementing distributed networks, such as local area networks ("LANs"). A "LAN" is a high-speed communications network which electrically couples a number of nodes together. A "node" is defined as a computer operating as a personal computer, workstation or server or any other electronic network connective device. As a result, distributed networks allow each user control over his or her own computer as well as access to other nodes coupled to the network. One well-known type of LAN is commonly referred to as an "Ethernet Network". Switches are also used in Ethernet Networks resulting in a network called a "Switched Ethernet Network".

Figure 1:
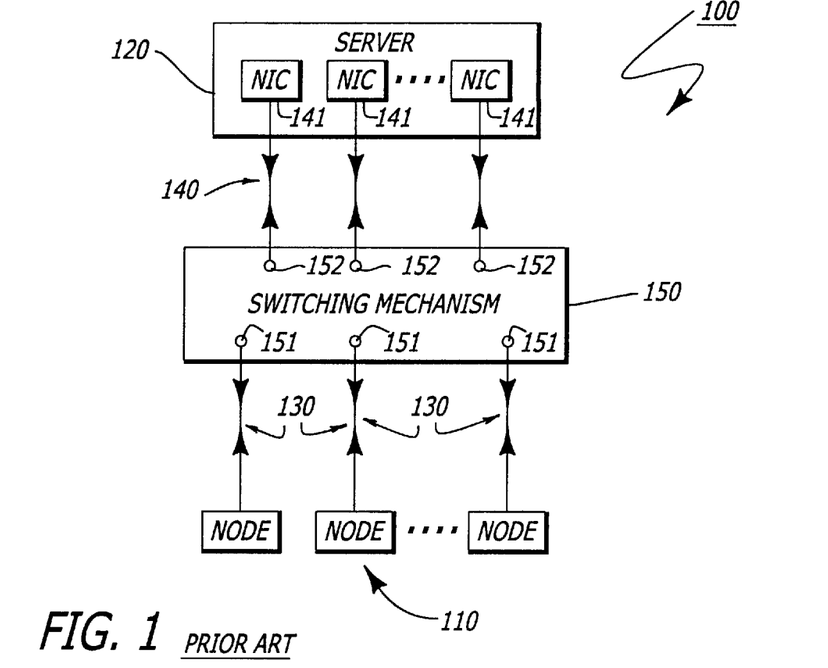
FIG. 1 is an illustrative block diagram of a conventional Switched Ethernet Network which may employ a static load balancing scheme or alternatively a purely dynamic load balancing scheme in association with multiple Network Interface Cards ("NICs") to increase the bandwidth available to the server of the Switched Ethernet Network.

As shown in FIG. 1, a Switched Ethernet Network 100 is a nonpriority based network which typically includes a plurality of nodes 110 which are electrically coupled to at least one server 120 normally through a plurality of client communication channels 130, a plurality of server communication channels 140 and a switching mechanism 150 having a number of ports 151 and 152 dedicated for each of the client and server communication channels 130 and 140, respectively. Server 120 is a node, loaded with software such as network application software and the like, that supports multiple server communications channels 140. Client and server communication channels 130 and 140 propagate information in parallel so that the nodes 110 and the server 120 can communicate.

Figure 2:
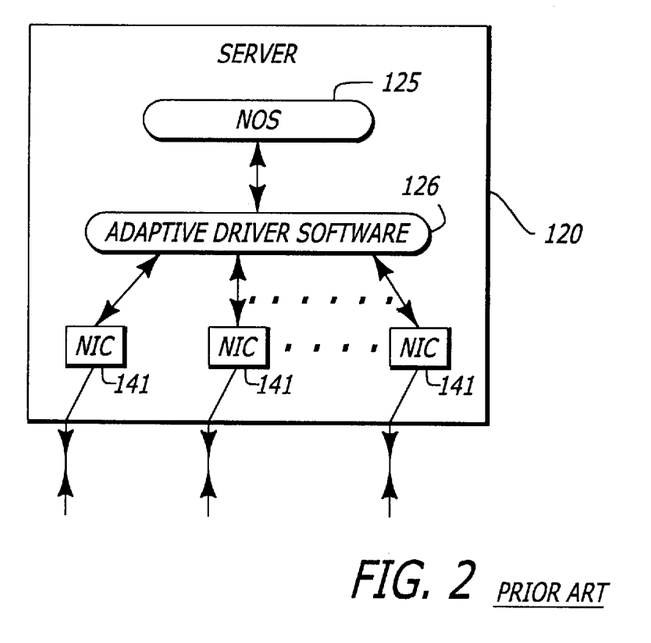
FIG. 2 is a block diagram illustrating a software architecture incorporated within a node functioning as a server to support multiple server communication channels.

Referring to FIG. 2, in a network environment, server 120 is implemented with network operating system ("NOS") software 125 such as, for example, NETWARE™ by Novell Corporation of Provo, Utah, running on a host processor. Of course, other NOS software may be implemented within server 120. Upon receiving requests for data from one of the plurality of nodes, NOS software 125, in operation, provides data packets to adaptive driver software 126 for transmission through one of server communication channels 140 in accordance with an IEEE 802.3 standard (ANSI/IEEE std. 802.3, 1982 first edition). Each of server communication channels 140 supports a limited bandwidth currently ranging from 10 million bits per second ("Mbps") up to approximately 100 Mbps for FastEthernet physical medium.

Referring to both FIGS. 1 and 2, in order to increase the bandwidth available for data transmission, server communication channels 140 from the server 120 may include multiple physical adapters (e.g., Network Interface Cards "NICs" 141), each assigned a unique identifier that functions as its address, which is typically referred to as a media access control ("MAC") address. These NICs 141 are controlled by adaptive driver software 126 which communicates with both NOS software 125 and NICs 141. Adaptive driver software 126 "virtualizes" these server communication channels 140 by presenting them to NOS software 125 as a single server communication channel having the collective bandwidth of the combined server communication channels 140. For example, the Switched Ethernet Network 100 would have a "virtual" server communication channel equivalent to the number of server communication channels times the bandwidth of a single server communication channel "$BW_{scch}$".

In operation, when a data packet is provided to adaptive driver software 126 for transmission, adaptive driver software 126, based on substantially predetermined parameters, select one of server communication channels 140 for use. By choosing different server communication channels 140 for different data packets, adaptive driver software 126 achieves "load balancing", a scheme where adaptive driver software 126 operates so as to distribute the data traffic load generally equally among the server communication channels 140.

Currently, Switched Ethernet Networks have been configured to operate in accordance with two types of conventional load balancing techniques. A first type of conventional load balancing technique involves adaptive driver software ascertaining a destination address of the data packet before it is transferred through one of the server communication channels. If the destination address is associated with a node that has not been assigned a server communication channel, adaptive driver software assigns that node to utilize a specific server communication channel. Thereafter, the adaptive driver software sequentially assigns a different channel to the next unassigned node until all nodes coupled to the network have been assigned substantially equally among the server communication channels. However, this technique is highly static in nature because channel assignment for the node is maintained throughout the duration of the communication session between the newly assigned node and the server. Moreover, although conventional network may achieve almost perfect load balancing if the data traffic load is evenly distributed, such situations are highly unusual in normal operation.

Another "load balancing" technique currently utilized by adaptive driver software is to assign one data packet at a time to different server communication channels in which the channel assignment is extinguished after every data packet transmission being one type of "purely dynamic" loading. Although this technique reduces disparate data traffic loads over server communication channels, it may result in a number of disadvantages. A first disadvantage is that for a "burst" data transfer (e.g., sending successive packets to a single node), there is a possibility that the data may become out of order at its destination. The reason is that the switching mechanism 150 may include first-in, first-out registers ("FIFOs") to receive data transmitted through ports 152. Over time, these FIFOs will likely be storing different amounts of data which would affect the order of data received by the destination node. A second disadvantage is that the switching mechanism would likely experience a data overflow because data is being transmitted to the destination node at a rate much greater than that supported by its client communication channels 130 coupling the node to switching mechanism 150. Both of these disadvantages result in performance degradation.

Therefore, it would be advantageous to provide a communication system and dynamic data traffic load distribution scheme which mitigates the above-identified disadvantages.

SUMMARY OF THE INVENTION

Briefly, in accordance with one embodiment, the communication system comprises a plurality of nodes in which at least one node is implemented with adaptive driver software to dynamically control the distribution of data traffic among multiple communication channels. Of these communication channels, when under dynamic control, only one channel is capable of receiving data requests and at least two of the channels are capable of transferring data packet(s) to the data requesting node.

BRIEF DESCRIPTION OF THE DRAWINGS

The features and advantages of the present invention will become apparent from the following detailed description of an embodiment of the present invention in which.

DETAILED DESCRIPTION OF THE INVENTION

In an embodiment in accordance with the present invention of a system and method for distributing dynamically data traffic load, a communication system includes a server with adaptive driver software capable of implementing a dynamic load balancing scheme that takes into account packet characteristics associated with the data traffic load before dynamically distributing the data among multiple communication channels. Such dynamic distribution improves the bandwidth available to a server of the network and increases throughput of the communication system.

Some terminology is used to discuss certain well-known networking terms. For example, the term "dynamic" refers to a technique of reassignment, adjustment or modification upon detecting a particular event. The term "data traffic load" pertains to the overall traffic transmitted by a server supporting multiple communication channels. A "data packet" is a sequence of information, usually bytes, including a header and data which may include at least one secondary header featuring a communication protocol. A "server communication channel" includes a physical adapter (e.g., Network Interface Card "NIC" being a removable hardware card coupled to a bus), a port of the switching mechanism and physical media coupling these two hardware features. A "client communication channel" collectively includes a port of the switching mechanism, physical media and either a port or a physical adapter at the node. In general, a "communication channel" is a communication path that allows information in the form of electrical signals (e.g., data, address and/or control signals) to be transferred from one node to another node.

Figure 3:
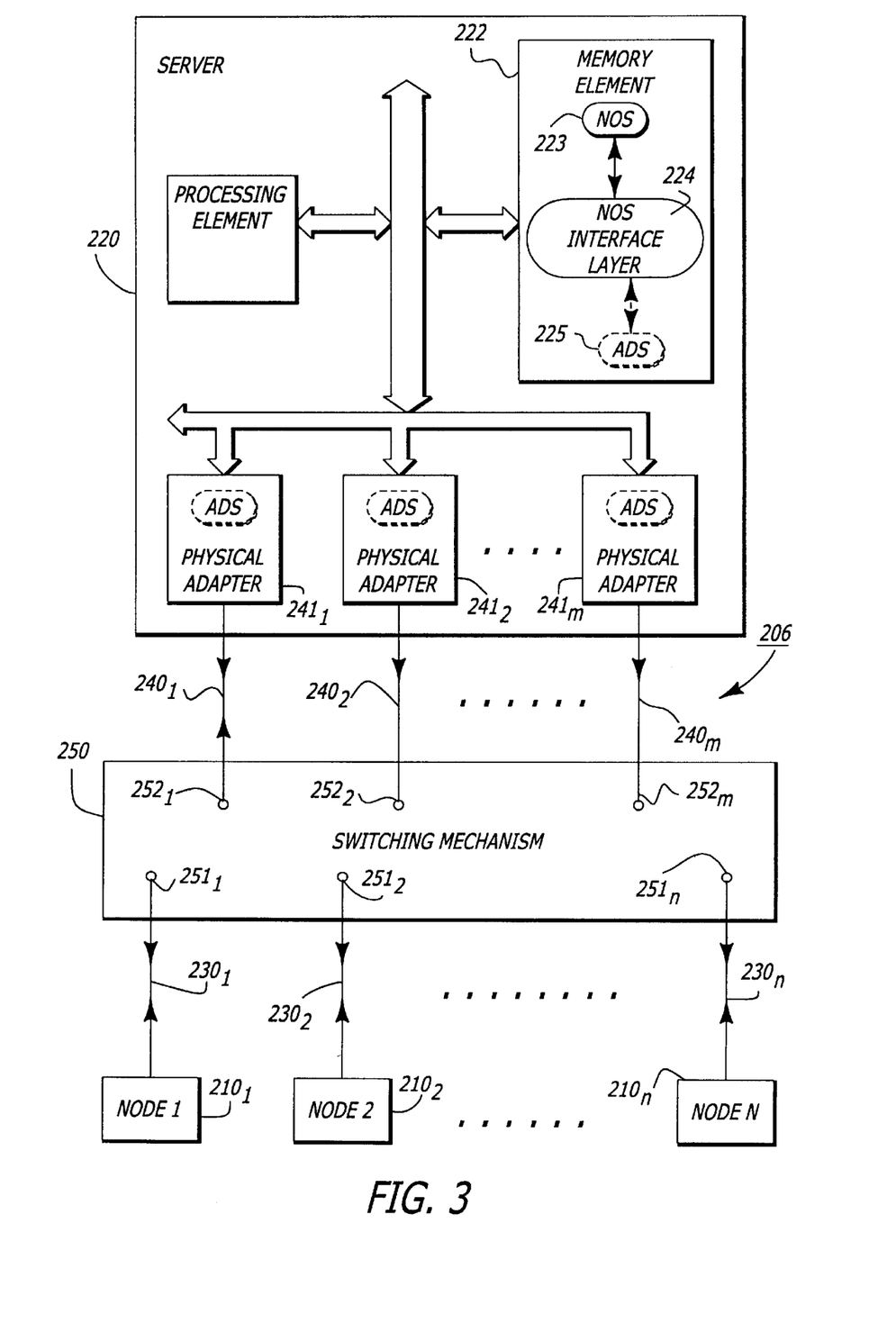
FIG. 3 is a detailed block diagram of an embodiment of the present invention in which the driver software imposes a specific load balancing scheme.

Referring now to FIG. 3, an illustrative block diagram of an embodiment of a communication system 200 configured to dynamically distribute data traffic from one or more electronic device(s) among multiple server communication channels is shown. Communication system 200 is illustrated as a non-priority based system (e.g., a Switched Ethernet Network) although it is contemplated that other types of non-priority based LANs as well as priority based LANs (e.g., Token Ring or Bus) may utilize the dynamic load balancing features of this embodiment of the present invention. Likewise, the topology of communication system 200 is illustrated as a bus type, although other topologies (e.g., a ring, tree, star, etc.) may be used.

As shown, communication system 200 comprises "n" nodes $210_1$–$210_n$ ("n" being an arbitrary, positive whole number, n>1) that operate as clients requesting information in the form of electrical signals (i.e., personal computers, workstations, etc.) and a node 220 which operates as a server which provides the requested information in the form of electrical signals. The coupling between nodes $210_1$–$210_n$ and node 220 includes "n" client communication channels $230_1$–$230_n$, "m" server communication channels ("m" being an arbitrary, positive whole number, m>1) $240_1$–$240_m$ and a switching mechanism 250. Switching mechanism 250 includes switches (not shown) which are used to couple one or more "n" ports $251_1$–$251_n$, usually uniquely coupled to client communication channels $230_1$–$230_n$, with "m" ports $252_1$–$252_m$ coupled to server communication channels $240_1$–$240_m$. Server communication channels $240_1$–$240_m$ include physical adapters $241_1$–$241_m$ as well as ports $252_1$–$252_m$ coupled by a preselected physical media, which may include, but is not limited to, coaxial cable, twisted copper-wire pairs and optical fibers. In this particular embodiment, client communication channels $230_1$–$230_n$ are similar in physical construction to the server communication channels $240_1$–$240_m$ but may not include a physical adapter, although the scope of the invention is not limited in this respect.

Node 220 includes a processing element 221 (e.g., device used to execute instructions) and a memory element 222 used to contain at least network operating system ("NOS") software 223 which controls network communications of the communication system and a NOS interface layer 224 which functions as a standard interface for driver software. The memory element 222 further may contain adaptive driver software 225 as shown substantially selected dotted lines; however, physical adapter 241 may also contain portions of adaptive driver software 225 within its internal memory as also shown through dotted lines. Processor 221 executes instructions associated with NOS software 223 and adaptive driver software 225 to control data traffic flow between one of nodes $210_1$–$210_n$ and node 220.

Figure 4:
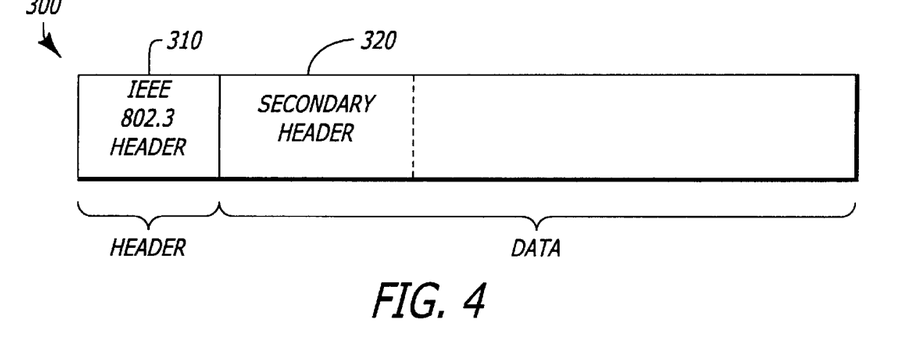
FIG. 4 is a detailed illustration of an embodiment of the data packet including a standard header and data bytes which include a secondary header.
Figure 5:
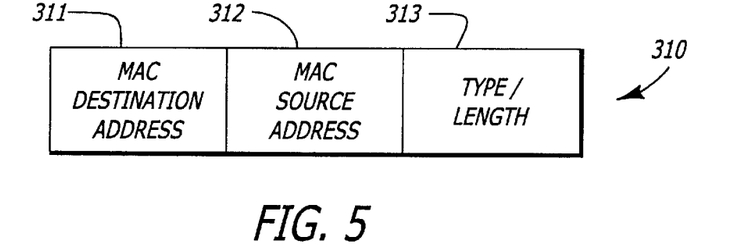
FIG. 5 is a detailed illustration of an embodiment of a byte configuration for the standard header of FIG. 4.

Referring to FIGS. 4 and 5, a bit representation of a typical data packet is shown which, in this particular embodiment, ranges in size between approximately 60 bytes and 1514 bytes although any byte length is contemplated and may be governed by its chosen media standard. Data packet 300 includes at least a standard header 310 (e.g., an IEEE 802.3 header as shown) and data normally including a secondary header 320 indicating a communication protocol to be utilized by the source node (e.g., an Inter-Packet Exchange "IPX" header as shown). It is, of course, understood that the header and data exist in the form of electrical signals. Likewise, it is contemplated that the communication system may support data packets having other types of standard and secondary headers besides the IEEE 802.3 and IPX headers.

As shown, the IEEE 802.3 header 310 provides routing and size information to switches and routers of the Switched Ethernet Network. The IEEE 802.3 header 310 includes a media access control ("MAC") destination address 311, a MAC source address 312 and a type/length field 313, each of which, in this particular embodiment, comprises 6 bytes, 6 bytes and 2 bytes, respectively. Each node coupled to the Switched Ethernet Network, including the server, possesses a unique MAC address. These MAC addresses are used to indicate the source (i.e. sender) of the data packet through the MAC source address 312 and the intended destination node (i.e., recipient) through the MAC destination address 311. The length/type field 313 indicates the length of the total data packet, excluding the IEEE 802.3 header, if the data packet length is less than 1500 bytes. Otherwise, the type field 313 indicates a particular type of data packet such as, for example, a DECNET™ protocol packet by Digital Corporation, a VINES™ protocol packet by Banyan Corporation or any other specific protocol utilized by the network owner.

Figure 6:
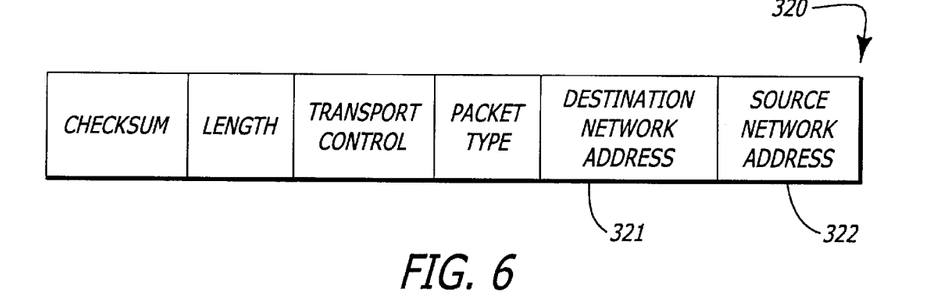
FIG. 6 is a detailed illustration of an embodiment of a byte configuration of an Inter-Packet Exchange "IPX" header used as the secondary header of the data packet shown in FIG. 4.

Referring to FIG. 6, the secondary header 320 features control information in the form of electronic signals pertaining to the original source of the data packet and its intended destination. Such information is desirable where the system comprises a global network including a collection of smaller localized networks coupled together through routers, bridges and the like. As a result, the standard header 310 may identify its destination as an intermediate router or bridge while secondary header 320 identifies the pair of nodes communicating with each other. If the secondary header 320 is an IPX header, in this particular embodiment, it is preferably 30-bytes in length and includes a number of byte fields; namely, a checksum field, a length field, a transport control field, a packet type field, a destination network address 321 and a source network address 322.

Figure 7:
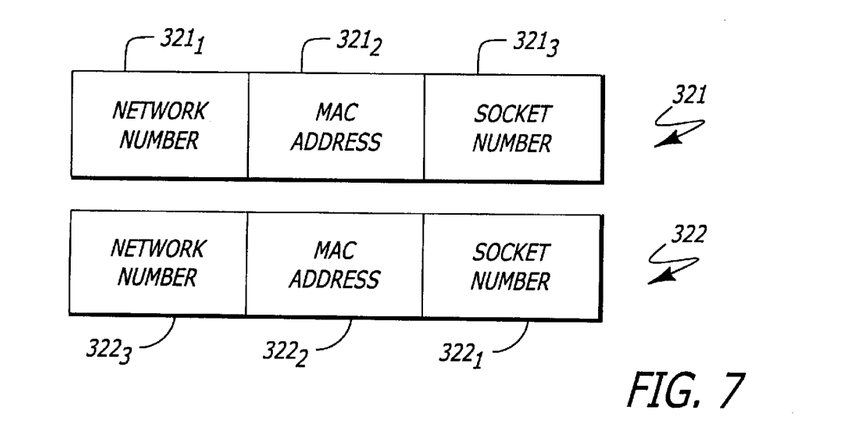
FIG. 7 is a detailed illustration of an embodiment of a byte configuration of one of the Network Address fields of the IPX header of FIG. 6.

As shown in FIG. 7, the destination and source network addresses identify the intended destination and original source of the data packet. Both the destination and source network addresses 321 and 322 include a network number, a MAC address and a socket number. The network numbers $321_1$ and $322_1$ identify the local area network of the destination node and the source node while MAC addresses $321_2$ and $322_2$ identify the nodes themselves and the socket numbers $321_3$ and $322_3$ identify the particular application (e.g., a network application software program such as NETSCAPE™, PROSHARE™ as well as other software programs) within the node. For example, the secondary header pre-assigns socket numbers for a number of applications. As a result, when there are multiple applications running on a node at least some of the different applications employ communication over the network, each application may be referenced by a different socket number.

Referring back to FIG. 3, to maintain a dynamic loading scheme while avoiding reducing, and perhaps avoiding, overflow of switching mechanism 250, which is not possible with conventional purely dynamic load schemes, adaptive driver software 225 is operated so as to select only one of the server communication channels (e.g., server communication channel $240_1$) as its primary channel to receive information from the plurality of nodes $210_1$–$210_n$. In contrast, all server communication channels $240_1$–$240_m$ may be used for data transmission. Thus, only a selected primary channel, such as channel $240_1$, is employed to provide requests for data to the server 220.

More particularly, where one of the plurality of nodes (e.g., node1 $210_1$) requests data from another node, such as server 220, it broadcasts a data request to switching mechanism 250 via client communication channel $230_1$. In this embodiment, switching mechanism 250 propagates the data request to all of ports $251_1$–$251_n$. Because adaptive driver software 225 operates as to select one of the server communication channels (e.g., server communication channel $240_1$) as its primary channel, it provides the data request to server 220 through that channel, via physical adapter $241_1$. Adaptive driver software 225 operates so as to receive the data request from physical adapter $241_1$ and operates so as to transmit a request to NOS software 223 for data packet(s) associated with the data request. The request indicates to NOS software 223 that the MAC address of the node requesting the data (e.g., node 1) is coupled to the primary channel $240_1$ having a bandwidth approximately equal to "m x $BW_{scch}$".

Thereafter, NOS software 223 operates so as to transfer the data packet(s) to be sent through primary channel $240_1$ to adaptive driver software 225 which operates so as to perform a search of look-up tables (not shown) contained in the adaptive driver software 225 to ascertain whether the destination node (e.g., node 1 $210_1$) already has been assigned to a particular server communication channel. Likewise, adaptive driver software 225 operates so as to ascertain whether this data packet is a first packet of a "burst" data transfer by analyzing control information in the form of electrical signals stored in various portions of the data packet. For example, for data packets utilizing the IPX header, this information is contained in a Netware Core Protocol ("NCP") field positioned in the data packet after the IPX header. Thus, for each data packet received from NOS software 223, adaptive driver software 225 operates to identify selected characteristics of the data packet before modifying the MAC source address of the standard header of the data packet to route it to a specific server communication channel. These packet characteristics are described in reference to FIG. 8 but are not limited to these packet characteristics.

Figure 8:
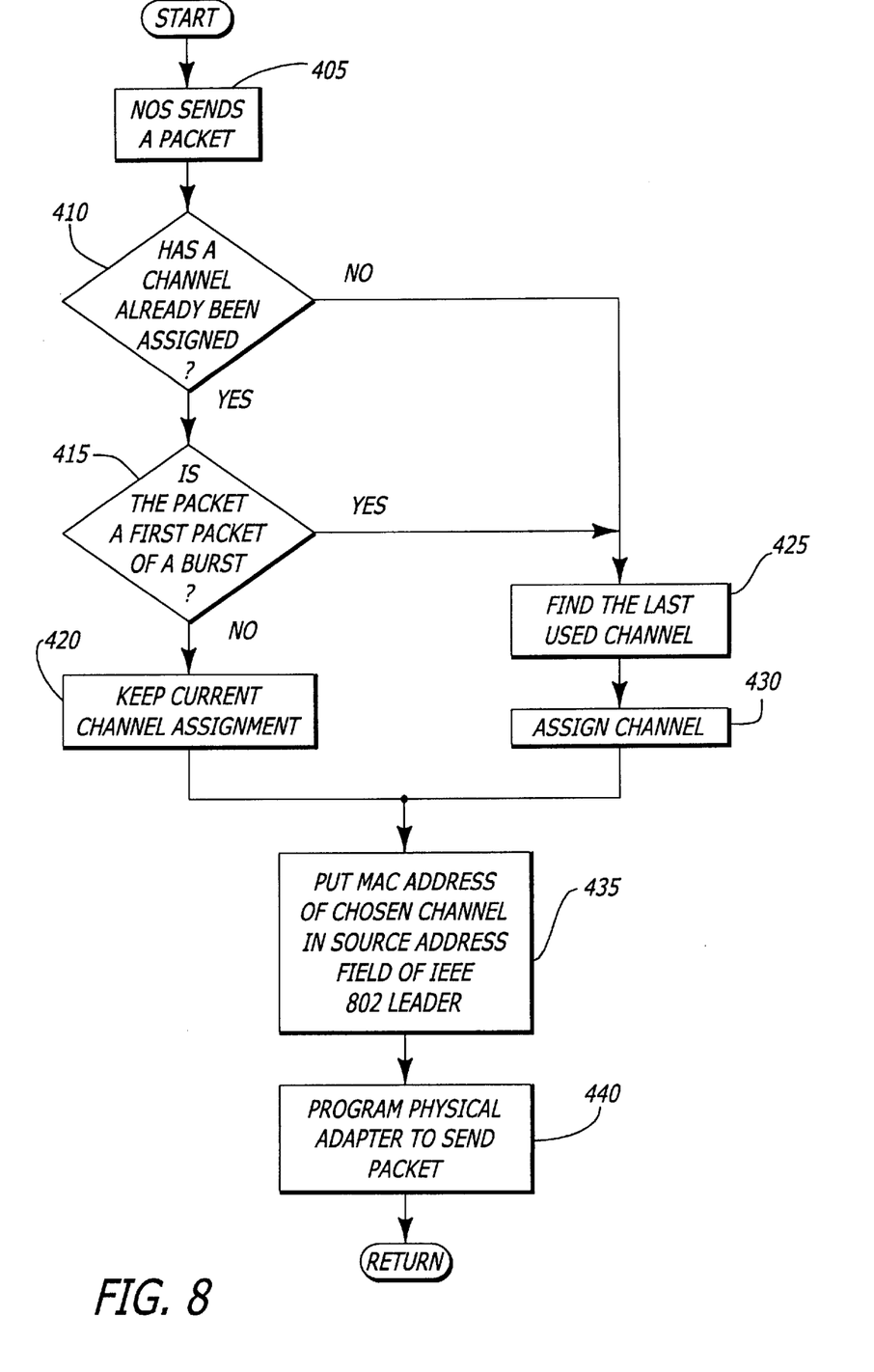
FIG. 8 is a flowchart illustrating the operations of an embodiment of adaptive driver software that may be implemented in an embodiment of a system for dynamic distribution of data traffic through multiple channels in accordance with the invention.

Referring now to FIG. 8, a flowchart of the operations of this particular embodiment of the adaptive driver software is shown. The advantage of this particular embodiment is that it reduces the possibility of overflow and data ordering problems. After NOS software 223 detects the data request from one of the nodes (e.g., "node 2"), it retrieves the data from the memory element associated with that data request, the NOS software 223 operates so as to transmit a data packet including data and a standard header to the adaptive software driver (Step 405). The standard header features an address of "node 2" as its destination network address, the address of the primary channel as its source address and source network address fields. If there is no intermediate routing, the destination address would further include the address of node 2. Otherwise, it would include the address of the intermediate router or bridge.

Next, the adaptive driver software operates to determine whether node 2 has been assigned to a server communication channel (Step 410). This is accomplished by the adaptive driver software operating to search look-up tables for the address of node 2 to determine whether there is a corresponding entry for the server communication channel.

There exists a prior entry if node 2 has previously broadcast a data request to the server. If so, the adaptive driver software ascertains whether the data packet constitutes a first packet of a burst data transfer (Step 415). This is accomplished by the adaptive driver software determining the contents on a particular field of the data packet assigned to identify the packet is part of a burst data transfer. Of course, the location of the field depends on the communication protocol chosen for the secondary header. If the data packet is part of a burst data transfer, the channel assignment is maintained (Step 420).

However, if the destination address is not assigned a corresponding server communication channel or the data packet constitutes a first data packet in a burst data transfer, the adaptive driver software reads each channel's traffic parameters to ascertain which channel has a lesser data traffic load, or preferably, the least data traffic load (Step 425) through identification of the number of data packets or bytes of data transmitted over the channel, or the number of clients assigned to a particular port supporting a particular channel. These traffic parameters may include, but are not limited to, the number of bytes transmitted in the last interval, the number of data packets transmitted in the last interval and the number of destinations already assigned to the channel. Upon ascertaining the channel having the least (or lesser) data traffic load, it is assigned for this data packet transfer (Step 430).

Thereafter, the adaptive software driver places the MAC address of the selected server communication channel in the source address field of the standard header and programs the physical adapter associated with that server communication channel to transmit the data packet through the selected server communication channel (Steps 435–440).

The present invention described herein may be designed in many different embodiments as evident to one skilled in the art than those described without departing from the spirit and scope of the present invention. The invention should, therefore be measured in terms of the claims which follow.

What is claimed is:

1. A communication system comprising:
   a plurality of nodes including at least a first node and a second node, at least said first node is loaded with an adaptive driver software to control communication between at least said first and second nodes;
   a switching mechanism coupled to said first node and said second node; and
   a first plurality of communication channels coupled to said first node and said switching mechanism, said first plurality of communication channels include an exclusive communication channel that is controlled by said adaptive driver software so as to propagate a data request from said second node and at least two communication channels of the first plurality of communication channels dynamically controlled by said adaptive driver software to propagate a data packet responsive to said data request from said first node to said second node.

2. The communication system according to claim 1, wherein said at least two communication channels includes said exclusive communication channel.

3. A communication system comprising:
   first node means for transmitting a data request and receiving a data packet associated with said data request;
   second node means for receiving said data request and transmitting said data packet to said first node means;
   switching means for routing said data request from said first node means to said second node means and for routing said data packet from said second node means to said first node means; and
   channel means for propagating said data request from said switching means to said second node means and said data packet from said first node means to said switching means, said channel means includes an exclusive communication channel selected by said first node means to propagate a data request from said second node means and at least two communication channels dynamically controlled by said first node means to produce a data packet responsive to said data request.

4. A node in communication with a plurality of nodes through a plurality of communication channels comprising;
   a processor;
   at least one physical adapter coupled to said processor, said at least one physical adapter to propagate a packet of data to the plurality of nodes; and
   a memory element coupled to said processor, said memory element being loaded with an adaptive driver software which, when executed by said processor, selects an exclusive channel of the plurality of communication channels for receipt of a data request and at least two channels of the plurality of communication channels to propagate said packet of data in response to said data request.

5. The node according to claim 4, wherein said at least one physical adapter includes a plurality ot physical adapters corresponding to each of the plurality of communication channels.

6. The node according to claim 4, wherein said adaptive driver software, when executed by said processor, dynamically controls communications with the plurality of nodes based on a set of predetermined characteristics associated with said packet of data including whether said packet data is a burst transfer.

7. The node according to claim 6, wherein said set of predetermined characteristics associated with said packet of data include electrical signals indicating whether the packet of data is part of a burst data transfer.

8. The node according to claim 6, wherein said set of predetermined characteristics associated with said packet of data further include a traffic parameter comprising at least one of (i) a number of bytes produced by said node in a last interval, (ii) a number of packets of data transmitted in said last interval and (iii) a number of destinations already assigned to said one of said first plurality of communication channels.

9. A node in communication with a plurality of nodes through a plurality of communication channels, the node comprising:
   adapter means for propagating an incoming data request and propagating an outgoing packet of data;
   memory means for storing an adaptive driver software to dynamically select an exclusive communication channel of the plurality of communication channels for the incoming data request and at least two communication channels for the outgoing packet of data; and
   processor means for executing said adaptive driver software.

10. A communication system comprising:
    a first plurality of communication channels; and
    a node communication channels by selecting an exclusive communication channel of the first plurality of communication channels to receive data requests and to dynamically control selection of at least two of the first plurality of communication channels to propagate a data packet in response to the data request.

11. The communication system according to claim 10, wherein each of the first plurality of communication channels corresponds with one of the plurality of nodes.

12. The communication system according to claim 10, wherein the node includes a computer.

13. The communication system according to claim 10, wherein, upon execution, adaptive driver software loaded into memory of the node identifies a set of predetermined characteristics of the data packet contained in at least one field of the data packet to select one of the first plurality of communication channels to propagate the data packet therethrough.

14. The communication system according to claim 13, wherein the set of predetermined characteristics include electrical signals indicating whether the data packet is part of a burst data transfer.

15. The communication system according to claim 13, wherein the characteristics of the data packet further include a traffic parameter comprising at least one of a number of bytes produced by the node in a last interval, a number of data packets transmitted in the last interval and a number of destinations already assigned to one of the first plurality of communication channels.

16. The communication system according to claim 10, further comprising:

a switching mechanism coupled to the node through the first plurality of communication channels; and a second plurality of communication channels coupled to the switching mechanism and at least one of the plurality of nodes.

17. A machine readable medium having embodied thereon an adaptive driver software for processing by a computer coupled to a plurality of computers through a plurality of communication channels, the adaptive driver software comprising:

a first program to select an exclusive channel of the plurality of communication channels to propagate a data request from one of the plurality of computers to the computer; and a second program to select at least two channels of the plurality of communication channels to propagate a data packet in response to the data request.

18. The machine readable medium according to claim 17, wherein the second program selects the exclusive channel as one of the at least two communication channels.

* * * * *

UNITED STATES PATENT AND TRADEMARK OFFICE
CERTIFICATE OF CORRECTION

PATENT NO. : 5,918,021
DATED : June 29, 1999
INVENTOR(S) : Aditya

It is certified that error appears in the above-identified patent and that said Letters Patent is hereby corrected as shown below:

Column 6,
Line 7, delete "2101" and insert -- $210_1$ --.

Column 8,
Line 65, after "node" insert -- to dynamically control communications over the first plurality of --.

Signed and Sealed this

Twenty-fifth Day of May, 2004

JON W. DUDAS
*Acting Director of the United States Patent and Trademark Office*